April 5, 1938.　　F. J. MERZ, JR., ET AL　　2,113,031
MODEL TIRE WHEEL
Filed June 23, 1936

Inventors
Frank J. Merz, Jr,
Clayton B. Merry,
and George B. Merz.

By John W. Maupin
Attorney

Patented Apr. 5, 1938

2,113,031

UNITED STATES PATENT OFFICE 2,113,031

MODEL TIRE WHEEL

Frank J. Merz, Jr., Clayton B. Merry, and George B. Merz, Seattle, Wash.

Application June 23, 1936, Serial No. 86,810

2 Claims. (Cl. 152—20)

Our invention relates to model tire wheels, and certain objects of the invention are to provide, as an article of manufacture, a miniature tire wheel of simple, sturdy and light construction that is particularly adapted for use on model and toy airplanes. Further objects are to provide a miniature tire wheel of sufficiently light and durable construction to withstand the rigorous usage encountered in model and experimental airplane flying, and to further provide the tire with buffer means for absorbing the shocks in case the wheel should strike the ground with any considerable force or in a deflated condition.

Figure 1:
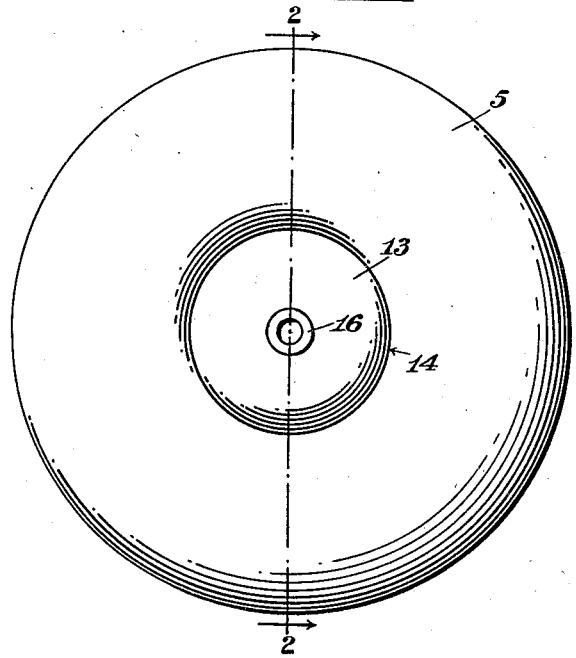
Figure 1 is a view in side elevation of the wheel.

Referring in detail to the drawing wherein like reference numerals indicate like parts in the several views, the numeral 5 designates a miniature tire tube having the usual opening around its inner periphery, each edge portion of which is enlarged and formed into an annular shoe 6. A diminutive valve 7 provides means for inflating the tire tube.

The side walls 8, which define the opening around the inner periphery of the tube 5 where the shoes 6 are joined thereto, are straight and flat. A rubber ring 9, also having flat sides, is interposed in said opening and the flat side walls 8 of the tube are fitted against the flat sides of the ring, and may be cemented thereto if desired. The outer peripheral portion of the rubber ring projects into the tube 5 all around as shown at 10. This is an important feature of the invention for the reason that the projecting portion of the rubber ring serves as a buffer or shock absorber in case the tire strikes the ground with unusual force or in a deflated condition.

The next step in the assembly of the wheel consists in the installation of a metal ring 11 which is preferably made of aluminum. The outer surface of this metal ring fits snugly into the annular opening defined by the inner surfaces of the rubber ring 9 and the annular shoes 6. The metal ring is installed in a centralized position and serves as a support for the rubber ring and the annular shoes. While this metal ring materially adds to the stability of the wheel, it may be omitted if desired, as in Fig. 4.

Figure 2:
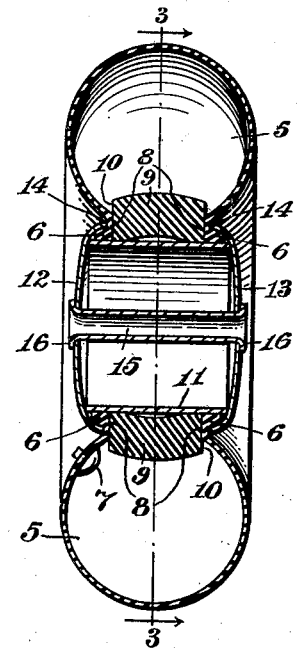
Fig. 2 is a view in central transverse section taken on a broken line 2—2 of Fig. 1.
Figure 3:
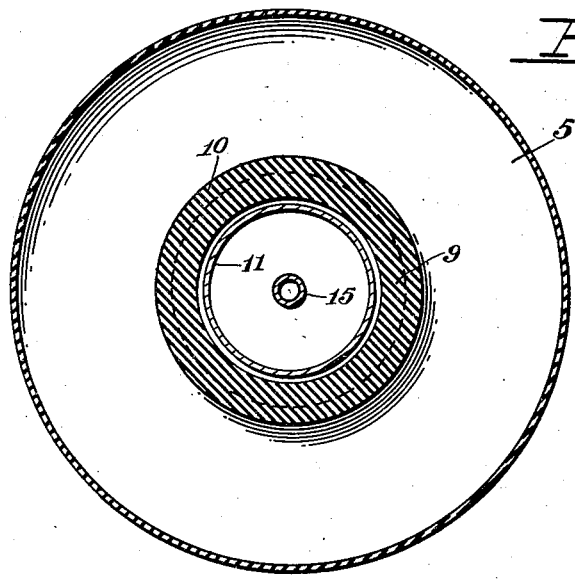
Fig. 3 is a view in central longitudinal section taken on a broken line 3—3 of Fig. 2.
Figure 4:
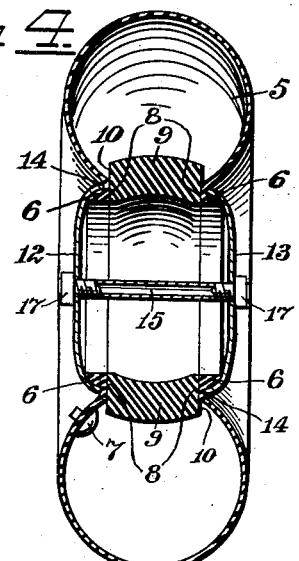
Fig. 4 is a view in central transverse section of a wheel having a slightly modified form of construction.

The last step consists in the installation of hub caps 12 and 13 which are also preferably made of aluminum. These hub caps are convex and are designed so that their inwardly curved outer edges fit into the depressions where the shoes 6 join the tire tube, as at 14. Said hub caps are provided with centrally aligned holes, and a tubular axle housing 15 is installed in said holes with its ends projecting slightly outside. These outwardly projecting ends are then simultaneously pressed inward with a suitable instrument which causes them to spread out when they are pressed inwardly and to clinch the hub caps, as at 16. The inward pressure draws the hub caps inwardly and causes their edges, at 14, to press the shoes 6 into secure engagement with the rubber ring 9. In this position, the hub caps bear against the edges of the metal ring 11, as shown in Fig. 2, thereby materially increasing the stability of the wheel as a whole. Instead of using the foregoing described clinching method, the outer ends of the tubular axle housing 15 may be threaded and nuts 17 may be used thereon to draw the hub caps inwardly as shown in Fig. 4.

A miniature tire wheel, made in accordance with the foregoing description, may be constructed at nominal cost, and be of sufficient durability to withstand all the rough usage and wear encountered in model and experimental airplane flying.

We claim:

1. As an article of manufacture, a model tire wheel consisting of an annular tire tube having an opening around its inner annular side, annular shoes formed on the edge portions of the tube around the opening and providing annular depressions where they join the tube, a rubber ring snugly interposed between the shoes, a metal ring fitting snugly against the inner surfaces of the rubber ring and annular shoes, convex caps having inwardly curved edge portions fitting into the annular depressions around the tube, means for securing the caps into forced engagement with the shoes whereby they are compressed against the rubber ring and said means consisting of a tubular clamping member serving as an axle housing and concentrically disposed with respect to the caps.

2. As an article of manufacture, a model tire wheel consisting of an annular tire tube having an opening around its inner annular side, annular shoes formed on the edge portions of the tube around the opening and providing annular depressions where they join the tube, a rubber ring snugly interposed between the shoes, said rubber ring projecting into the tire tube, a metal ring fitting snugly against the inner surfaces of the rubber ring and annular shoes, convex caps impinging the outer edges of the metal ring and having inwardly curved edge portions fitting into the annular depressions around the tube, and means for securing the caps in forced engagement with the shoes whereby they are compressed against the rubber ring.

FRANK J. MERZ, Jr.
CLAYTON B. MERRY.
GEORGE B. MERZ.